Sept. 17, 1957  A. B. HENDRYX  2,806,446
BIRD CAGE

Filed Sept. 9, 1953  2 Sheets-Sheet 1

INVENTOR
A. B. Hendryx
BY Rockwell & Bartholow
ATTORNEYS

Sept 17, 1957     A. B. HENDRYX     2,806,446
BIRD CAGE
Filed Sept. 9, 1953     2 Sheets-Sheet 2
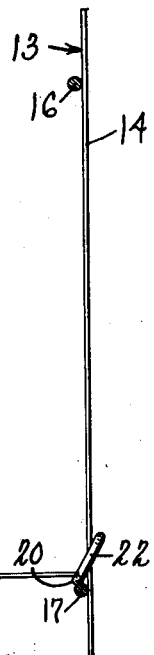
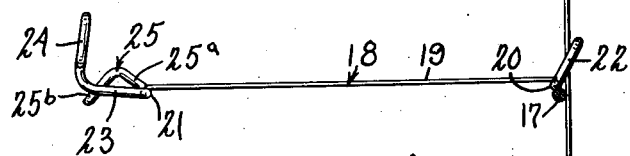
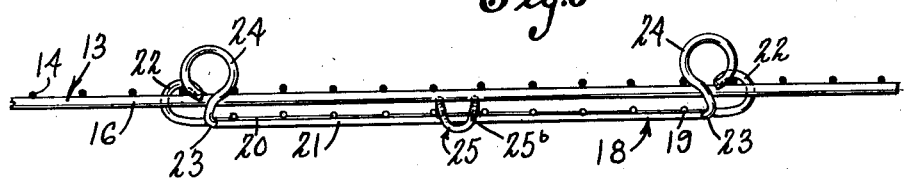
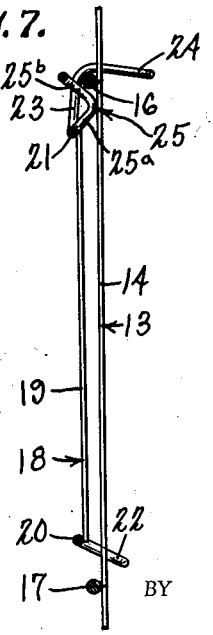
INVENTOR
A. B. Hendryx
BY Rockwell & Bartholow
ATTORNEYS

United States Patent Office 2,806,446
Patented Sept. 17, 1957

2,806,446

BIRD CAGE

Andrew B. Hendryx, North Haven, Conn., assignor to The Andrew B. Hendryx Company, New Haven, Conn., a corporation of Connecticut Application September 9, 1953, Serial No. 379,181

5 Claims. (Cl. 119—17)

This invention relates to bird cages, and while not limited thereto has more particular reference to doors or like closure members for cages in which the door-equipped portion of the cage presents a panel comprising vertically extending, parallel wires.

An object of the invention is to provide an improved door construction for bird cages.

Another object of the invention is to provide a door of improved structure which will serve not only as a closure for the cage but also as an outstanding platform associated with the opening leading into the cage body. Thus a door structure embodying the invention adapts the cage for use with birds such as parakeets which are given more liberty than canaries, for example.

In the accompanying drawings:

Fig. 5 is a section on line 5—5 of Fig. 4;

Fig. 6 is a section on line 6—6 of Fig. 2; and

Fig. 7 is a section on line 7—7 of Fig. 2.

Figure 1:
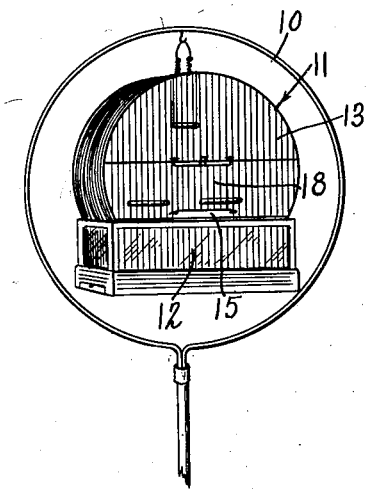
Fig. 1 is a perspective view on a small scale of a cage embodying the invention, the cage being supported in its stand.
Figure 2:
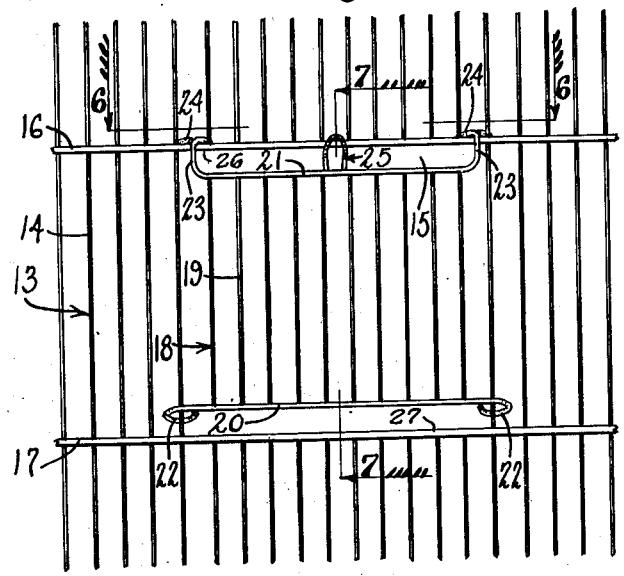
Fig. 2 is a fragmentary view on a larger scale of the front panel portion of the cage, the door being in the closed position as in Fig. 1.

The cage selected for illustration is one in which the cage body is of close wire construction so that the cage is well adapted for small birds, such as canaries and finches, as well as parakeets and other larger birds. The front panel of the cage is shown as comprising closely spaced, vertical wires crossed by at least two heavier horizontal wires, the cage opening being provided between the horizontal wires and having associated therewith a vertically movable door. The door, like the panel, is made up for the most part of vertical, closely spaced wires, the latter being suitably connected at their ends to somewhat heavier horizontal wires that define the upper and lower boundaries of the door. As hereinafter described, the lower horizontal wire of the door has terminals by which the door is guided vertically; and the upper horizontal wire of the door is equipped with terminals controlling the door position and with a finger piece which also serves to latch the door in the closed position.

In the drawings, the upper part of the bird cage stand is indicated at 10, and at 11 is indicated the bird cage suspended in the stand, and at 12 a glass enclosure for the lower part of the cage. The front panel of the cage is indicated at 13, the vertical wires of this panel at 14, the door opening at 15, the upper horizontal wire defining the door opening at 16, and the lower horizontal wire defining the opening at 17. The door is indicated at 18, the vertical wires of this door at 19, the horizontal lower wire of the door at 20, and the upper horizontal wire of the door at 21.

As will be apparent, the opening 15 in the cage body has as its upper and lower boundaries the wires 16 and 17 of the cage, and as its side boundaries two of the vertical wires 14. It is understood that the wires 14 in some places cross the wires 16 and 17 and are suitably fixed thereto as by welding.

The terminals of the lower door wire 20 are indicated at 22, and these are shown as loops formed integrally with the door wire and extending around the vertical wires which are the side boundaries of the door opening, the arrangement being such that the lower part of the door is retained and guided for up-and-down movement. At the lower limit of its movement the lower boundary of the door can engage and rest upon the lower boundary of the door opening, and it may be noted at this point that the loop terminals 22 are set at an inclination to the general plane of the door, as appears from Figs. 5 and 7, the reason for this being explained later on.

The upper horizontal wire 21 on the door has its end portions extended upwardly beyond the main portion of this wire, as indicated at 23, and each of these upward extensions is continued integrally to form a loop 24. Each loop 24, when the door is in a vertical position, extends above the body of the door and substantially horizontally in a rearward direction so as to lie somewhat behind the general plane of the door body. The size of the loops 24 is such that they approximate the spacing of the vertical wires 14. The wires 14 are somewhat resilient, and the arrangement is such that the terminals 24 can be pressed rearwardly through the spaces between their associated body wires when the door is in the open position, and in fact when the door is in a partially opened position, although, on the other hand, this manipulation cannot be effected when the door is near the lower limit of its closing movement owing to the rigidity imparted by the cross wire 16.

The finger piece used in manipulating the door is indicated at 25, and in this embodiment, this finger piece is made of a piece of wire which is generally of U-shape and has its extremities welded to the middle portion of the door wire 21. The finger piece extends upwardly from this door wire, and at a point between its ends, it is bent so that it presents portions extending in planes that are at approximately right angles to each other, as shown in Figs. 5 and 7, one of thsse portions being indicated at 25ª and the other at 25ᵇ. In the closed position of the door the rearwardly turned portions of wire 21 adjacent the loops 24 rest on the wire 16, and thus further downward movement of the door is prevented, the lower boundary of the door being somewhat elevated with respect to the wire 17. The finger piece 25 is then in the position shown in Fig. 7 with the part 25ᵇ underlying the wire 16 so as to inhibit movement of the door in an upward direction. Thus the door is latched in the closed position, but by forcing the finger piece 25 in an upward direction, it will ride over the wire 16 and the door is then free to be opened by a vertical movement which is arrested when the loops 22 at the lower part of the door make contact with the wire 16.

After opening in the manner above indicated, the door may be closed by releasing the finger piece, whereupon the door while in an upright position will drop by gravity until the lower part of the finger piece makes contact with the wire 16. Then in order to latch the door in the closed position, the finger piece is given downward pressure so that it rides over the wire 16 to occupy the latched position.

Figure 3:
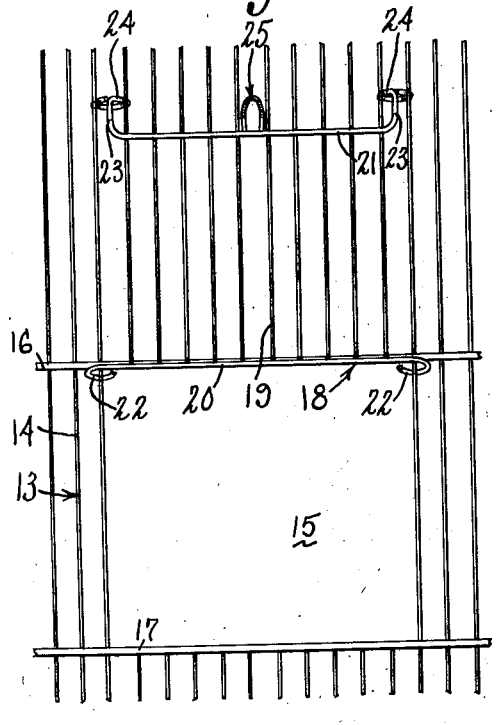
Fig. 3 is a view similar to Fig. 2 showing the door as lifted to the upper limit of its opening movement.
Figure 4:
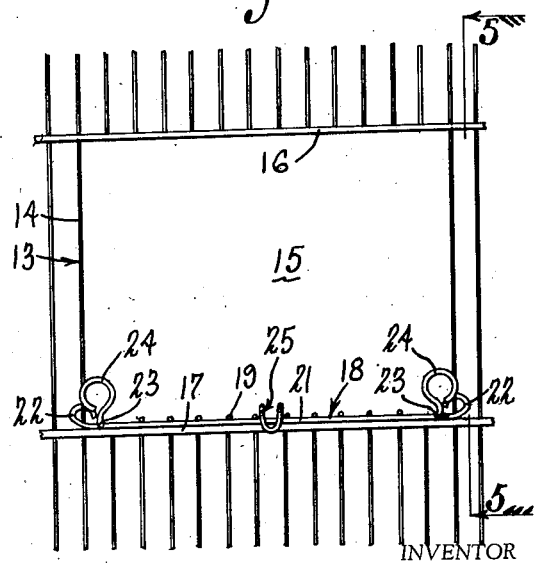
Fig. 4 is a view similar to Fig. 3 showing the door in its lower outstanding position in which it serves as a platform.

Assuming the door to be in the lifted position previously mentioned, it is possible to lower it into a position in which it will serve as a platform or stage for the bird. In the lifted position of Fig. 3, the upper end of the door can be drawn forwardly so that the members 24 pass outwardly between their associated wires for the purpose of swinging out into the platform position and, upon lowering the door, it will come to rest in a substantially horizontal position with the inclined loops 22 each in the position of Fig. 5. The inclination of the loops 22 engaging two of the wires 14 enables the door to take and remain in the substantially horizontal position. To reclose the door, it is simply necessary to elevate it somewhat with reference to the door opening and then, by a swinging movement, press the upper loops 24 rearwardly between their associated wires into the holding position of the loops and to shift the door downwardly to the fully closed and latched position.

The looped retention members 24 provided on the door, which in the form shown are terminals of the door wire 21 are, at a certain elevation of the door, forcible between certain of the upper vertical wires for retaining the door in a slightly elevated position with respect to the lower boundary of the door opening or doorway and for guiding the door as it is raised. At the lower end of the door the loops 22 provide guide connections with the side boundaries of the door opening. The door opening has upper and lower boundaries 26 and 27, respectively. The lowered open position of the door in which it stands outwardly from the cage panel at approximately the level of the lower doorway boundary is shown in Fig. 5. The vertical wires which are laterally spaced parts just above the door opening provide retention means above the upper boundary 26 cooperating with the retention means 24 carried at the upper end of the door. The loops 22 constitute guiding members and they also are pivoting members enabling the door to be swung to and held in the outstanding lower position referred to above.

It will be apparent from the foregoing that the invention provides a very simple, inexpensive and easily operable door construction for bird cages. There is an improved construction and arrangement of upwardly slidable door which is effectively guided with respect to the door opening and permits the door to be readily unlatched, lifted to permit the bird to leave or enter the cage, and lowered and latched. The guiding instrumentalities for the door are very simple and effective, the latch is simple and effective, and the same part which acts as a finger piece for lifting cooperates with the upper boundary of the opening for latching purposes so that the member referred to is a combined finger piece and latching member, the latching member cooperating with a cross wire that is ordinarily a part of the cage structure.

It will also be apparent that a definite advantage of the improved structure arises from the fact that the cage is adapted for use with parakeets and like birds where it is desirable to have an outstanding platform associated with the cage entrance. By easy manipulation the door with its associated latch which serves to close the cage entrance can be utilized as a platform member movable from a horizontal outstanding position to a vertical entrance-closing position and vice versa.

It is apparent from the foregoing that the door is mounted for sliding movement in a vertical direction, being guided at its lower part along the side boundaries of the opening and being guided at its upper part by retention members extending through spaces between certain wires above the cage opening. These provisions together with the latch provide a desirable closure for a cage for a canary, for example. When it is desired to have a stage or platform for the bird, the door, while in a lifted position, can be swung downwardly and outwardly, making use of the members 22 which then act as pivot members engaging the side wires of the opening at any of a number of different points. As the door is outwardly swung in this way, it can be lowered to engage the lower boundary of the opening and to hold the door substantially horizontal.

Thus the slidable door can be swung about a substantially horizontal axis to convert it into an outstanding platform, and a door such as described considerably enhances the utility of the cage.

While the members 22 at the lower part of the door which act as retainers and guide connections and slidable pivot members are illustrated as wire loops, they can take other forms, and the members 24, which will pass through the panel for retention purposes when the door reaches a certain elevation above its latched position but will not pass through the panel at a lower elevation of the door, can also take other forms. This is true also of the member associated with the upper part of the door which latches the door in the closed position.

While only one form of the article is disclosed in the drawing, the invention can be embodied in various other forms and various changes can be made in the details within the scope of the claims.

What I claim is:

1. A bird cage comprising a body having therein a substantially rectangular opening through which the bird can be introduced into the cage, and a substantially rectangular door for said opening slidable while the door is uprightly disposed between a lower position in which it closes the opening and an upper position in which said opening is opened and movable by a reverse movement to close said opening, said door carrying means at the lower part thereof for guiding the door along the sides of the opening in its up and down movement, said door also having means at its upper portion engaging the cage body above the opening and guiding the door in its up and down movement and inhibiting during such movement outward swinging movement of the upper portion of the door, said last-named means including an element manually releasable from the cage body to permit such outward swinging movement, said guiding means at the lower part of the door engaging the cage body to pivot the door about a horizontal axis in said swinging movement and support the door when so swung in a position in which it extends horizontally and outwardly from the lower boundary of said opening.

2. A bird cage as defined in claim 1, in which the side boundaries of said opening are constituted by vertical wires and in which the means for guiding vertically the lower part of the door and for supporting it in horizontal outstanding position comprises loop members embracing said wires.

3. A bird cage as defined in claim 1, in which the guide means for the upper part of the door comprises terminal loops on a horizontal wire provided at the upper end of the door, said loops at a certain elevation of the door being engageable between pairs of upright wires in the cage body above the opening.

4. A bird cage having a side wall provided between its upper and lower ends with a rectangular opening, said opening having upper and lower boundaries, and a door for said opening slidable in opposite directions with the door in a substantially vertical plane between a lower closing position and an upper open position, said door also being outwardly swingable on a lower pivot into a position in which it extends substantially horizontally from the lower boundary of said opening to provide an outstanding platform, said door having at the upper portion thereof means engaging said wall to guide the door vertically as aforesaid, said means being disengageable to permit said outward swinging movement, and said door having at the lower portion thereof a second means engaging said wall for guiding the door vertically as aforesaid, said second means pivoting said door and supporting it in said platform position.

5. In a bird cage, a cage portion comprising spaced vertical wires and apertured to provide an entrance opening having upper, lower and side boundaries, and a door for said opening having a body equipped with mounting means whereby said door is mounted on said cage portion for sliding movement with the door in an upright plane from a lower closed position to an upper open position, said mounting means including retaining means carried by said body at the upper portion thereof engaging certain of said cage wires for guiding said body for said sliding movement, said retaining means being disengageable from said certain wires to permit the door to swing outwardly on a lower pivot, and a second retaining means carried by said body at the lower portion thereof engaging certain of said cage wires to guide the door body in said sliding movement, said second retaining means being related to its associated wires to provide said lower pivot for the door and engaging said wires to hold the door in a platform position adjacent the lower boundary of said opening.

References Cited in the file of this patent

UNITED STATES PATENTS

| | | |
|---|---|---|
| 309,338 | Drayton | Dec. 16, 1884 |
| 1,657,578 | Markow | Jan. 31, 1928 |
| 1,760,936 | Dean | June 3, 1930 |
| 1,825,504 | Carr | Sept. 29, 1931 |
| 1,990,191 | Leindorf | Feb. 5, 1935 |
| 2,252,348 | Mager | Aug. 12, 1941 |
| 2,478,883 | Willis et al. | Aug. 9, 1949 |
| 2,612,862 | Ipsen | Oct. 7, 1952 |
| 2,624,310 | Smithson | Jan. 6, 1953 |
| 2,693,786 | Babros et al. | Nov. 9, 1954 |